Feb. 28, 1967 D. M. PARK 3,307,075
OVERCURRENT AND UNDERCURRENT CONTROL CIRCUIT
Filed July 19, 1963 3 Sheets-Sheet 1

INVENTOR.
DONALD M. PARK
BY
B. B. Olive
ATTORNEY

Feb. 28, 1967 D. M. PARK 3,307,075
OVERCURRENT AND UNDERCURRENT CONTROL CIRCUIT
Filed July 19, 1963 3 Sheets-Sheet 2

INVENTOR.
DONALD M. PARK
BY
B. B. Olive
ATTORNEY

OVERCURRENT AND UNDERCURRENT CONTROL CIRCUIT

Filed July 19, 1963 3 Sheets-Sheet 3

INVENTOR.
DONALD M. PARK
BY
B. B. Olive
ATTORNEY 3,307,075

OVERCURRENT AND UNDERCURRENT CONTROL CIRCUIT

Donald M. Park, Raleigh, N.C., assignor, by mesne assignments, to Dur-Ral Electronics Company, Inc., Raleigh, N.C., a corporation of North Carolina Filed July 19, 1963, Ser. No. 296,242
3 Claims. (Cl. 317—33)

This invention relates to control circuits for relay means and more specifically to a fast acting relay control circuit in which the relay is operated by stored capacitor current passed through a transistor that is triggered by triggering means controlled by the magnitude of current being controlled. Within certain ranges of current, the circuitry of the invention may provide both overcurrent and undercurrent control and is especially useful as an overload device.

In conventional overload control devices, various forms of clocks, fixed timing circuits, thermal relays or the like are provided to compensate for the initial current surge. The time delay in conventional overload devices is thus dictated not by the load requirement but rather by the characteristics of the particular time delay means employed. Consequently, a given rating of overload device is limited in its range of operation and its reliability is tied to a great extent to the reliability of the time delay system employed with the device. Many conventional overload devices are relatively slow in operation compared to the speed with which electrical equipment must be cut off from the electrical source in order to avoid damage in a high current situation. Much damage has resulted to electrical and related mechanical equipment because of the inability of the conventional overload equipment device to respond fast enough. Another characteristic of conventional overload protective circuits is that they are usually not adapted to both alternating and direct current uses. Conventional overload devices are frequently operable only at one specific current setting or at the most perhaps four specific current values.

An object of the present invention is to provide a system for almost instantaneously sensing when a current in an electric line falls outside some predetermined boundary values and employing the sensed current change to interrupt current flow in an electric line.

Another object of the present invention is to provide a system for almost instantaneously sensing a rise in current in an electric line of some predetermined value above a previously reached steady state value and simultaneously employing the effect of the rise to interrupt current flow in an electric line.

Another object of the invention is to provide an overload protective circuit which does not depend on clocks, fixed timing circuits, thermal relays and the like for providing the necessary delay during the initial starting surge.

Another object of the invention is to provide an overload protective circuit in which the tripping response time is substantially lower than with thermal relay type protective circuits and the like.

Another object is to provide an overload protective circuit which adapts itself to both alternating current and direct current applications.

Another object is to provide an overload protective circuit which can be adjusted to many different current values.

These and other objects of the invention will become apparent from the description and the drawings in which a circuit embodying the invention is shown.

In accordance with a preferred form of the invention as applied to protecting electric motors, the line current is passed through a low impedance coil whose field influences a normally open reed switch such that the coil field tends to close the reed switch contact. When closed, the reed switch passes a control current which triggers a transistor base and completes a heavy direct current path through the transistor to the relay or other device being controlled. The triggering control current through the reed switch to the transistor base and operating current for the relay is provided primarily by a capacitor which charges during the steady state normal operation of the motor and discharges through the reed switch to the transistor base only when the reed switch is closed under the influence of an overcurrent or undercurrent. The range of operation may be regulated to many current settings by an adjustable bucking coil whose field counteracts the low impedance coil field. The circuit is arranged such that during startup when there is normally a heavy surge of current to the motor, insufficient current reaches the relay to cause it to operate and the capacitor is prevented from charging due to the charge being drained off by reason of the cycling on and off of the reed switch. Protection is afforded by the circuit whether under alternating current or direct current operation so long as the values of the components are selected for the particular operation to be followed.

Figures 1, 2, 3:
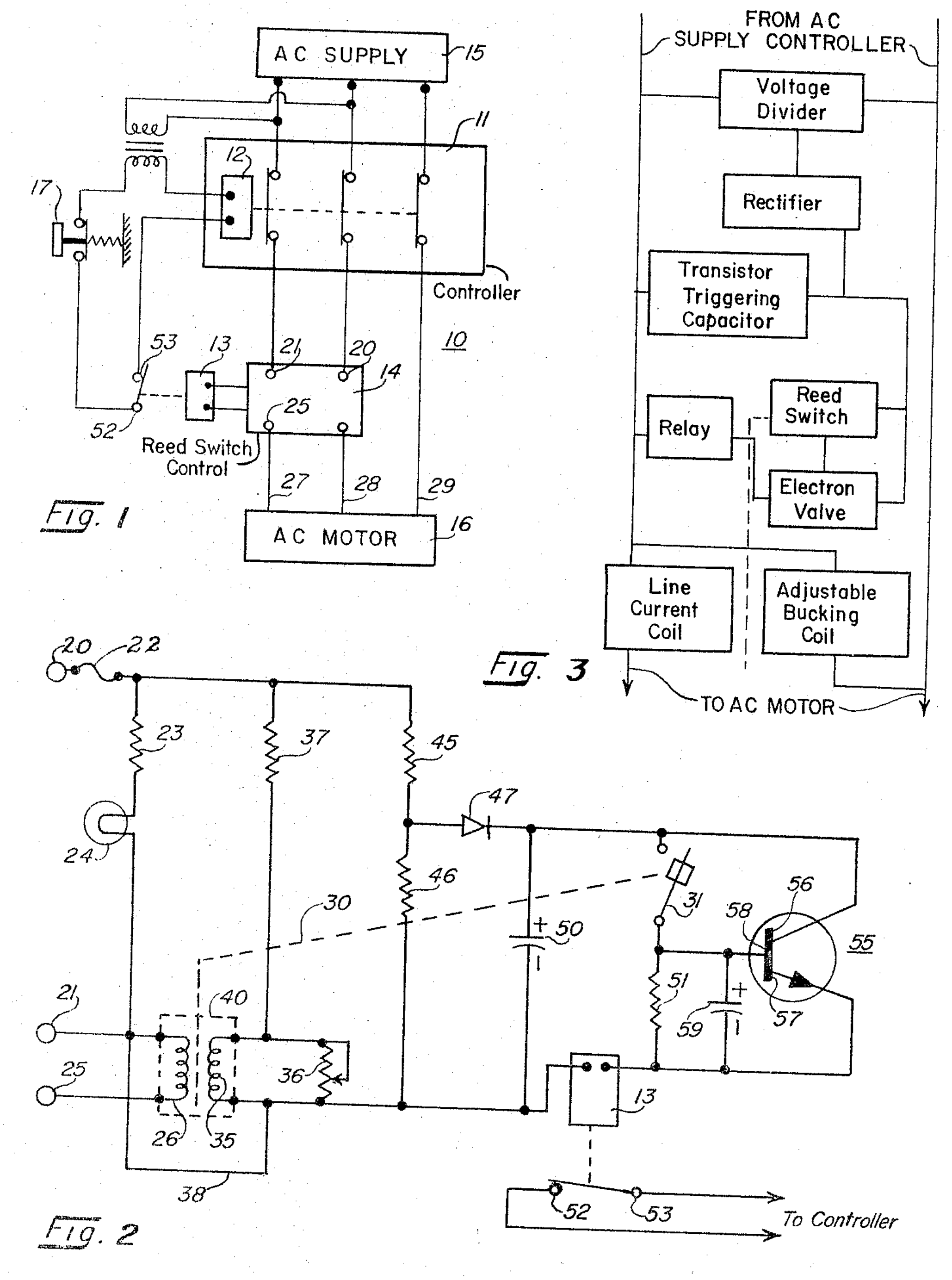
FIGURE 1 is a block diagram of a typical application of the invention.
FIGURE 2 is a detailed circuit diagram of a circuit embodying the invention.
FIGURE 3 is a block diagram of the circuit of FIGURE 2.

Referring now to the diagram of FIGURE 1 showing one form and application of the invention, there is shown an alternating current power system 10 which includes a controller 11 having a normally closed power relay 12 the opening of which is controlled by the normally closed control relay 13, preferably of the lockout type, which in turn is controlled by the reed switch relay control circuit 14 embodying one form of the invention and to be explained later. Power is supplied from a source 15 through the controller 11 through the reed switch control 14 and to the power consuming device represented by the motor 16. Assuming a steady state situation has been achieved, controller 11 and relay 13 remain closed thereby allowing power to flow to and operate motor 16 however, upon occasion of an overcurrent, reed switch control 14 causes relay 13 to open thereby causing relay 12 to open and the power to motor 16 to be shut off. Manual operation is provided by a pushbutton switch 17. While a three phase alternating current operation is set forth in the drawing, it should of course be understood that the same basic arrangement may be adapted for direct current operation.

Referring now to FIGURE 2 which is a detailed diagram of the reed switch control 14, there is shown a pair of input terminals 20, 21, protected by a suitable fuse 22 and across which is connected a current limiting resistor 23 and a neon gas tube indicating lights 24. Between terminal 21 and a third terminal 25 there is connected a relatively low impedance coil 26. Terminals 21 and 25 carry the line current for one of the three lines 27, 28, 29 serving motor 16 and by reason of being in series with terminals 21 and 25, coil 26 operates as a line current sensing device and as a source of field strength proportional to the line current. As indicated by the dashed line 30, the field produced by coil 26 is arranged so that it tends to close the normally open contacts of a magnetic reed switch 31. That is reed switch 31 tends to open and close under the influence of the alternating current magnetic field produced by coil 26 which field as previously stated is proportional to the line current going to the power consuming device which in this case is illustrated as being the motor 16.

In order that control 14 may be adjusted to different current ranges, the field effect of coil 26 is regulated by a bucking coil 35 which is arranged in parallel with an adjustable current shunting resistor 36. The parallel combination of coil 35 and resistor 36 is in turn arranged in series with a current limiting resistor 37 and this series combination is connected between terminals 20 and 21, the connection to terminal 20 being through the fuse 22 and the connection to terminal 21 being through the connecting wire 38. In the actual device coil 26 and coil 35 may occupy a common housing represented by the dashed line 40 and in housing 40 the coils may be arranged to physically surround reed switch 31. In operation the magnetic field produced by coil 35 is proportional to resistor 37 and is inversely proportional to resistor 36 and is 180° out of phase with the magnetic field produced by coil 26. As later discussed in reference to FIGURE 4, the setting of variable resistor 36 determines the operating current range.

A relatively low alternating current voltage is obtained from a voltage divider which consists of the series combination of a resistor 45 and a resistor 46 which is connected across terminals 20 and 21. A relatively low alternating current voltage is thereby furnished to a rectifier 47 which in turn makes available a relatively low direct current voltage for operation of the remainder of the circuitry to be explained.

To complete the circuit description, a filter capacitor 50 for the direct current supply is connected across resistor 46 and rectifier 47. In parallel with capacitor 50 is the series combination which includes the reed switch 31, a transistor base return resistor 51 effective to shunt the "$I_{co}$" current, and the operation coil of the relay 13 which controls the making and breaking of a connection between the relay terminals 52 and 53. A transistor 55 is arranged with its collector 56 connected to the output side of the rectifier 47, its emitter 57 connected to the relay 13 and its base connected to a point between reed switch 31 and resistor 51. A filter capacitor 59 that acts to integrate the magnetic reed pulses is also connected to the transistor base 58 and in parallel with the resistor 51.

While the transistor offers many advantages in a circuit of the kind being described, it will be understood that in the sense of a transistor being an "electron valve" various type of grid controlled electronic tubes would serve the same purpose. As illustrated by the more generalized block diagram of FIGURE 3, the electron valve in whatever form could be utilized in the circuit as illustrated and effect the purposes of the invention.

Figure 4:
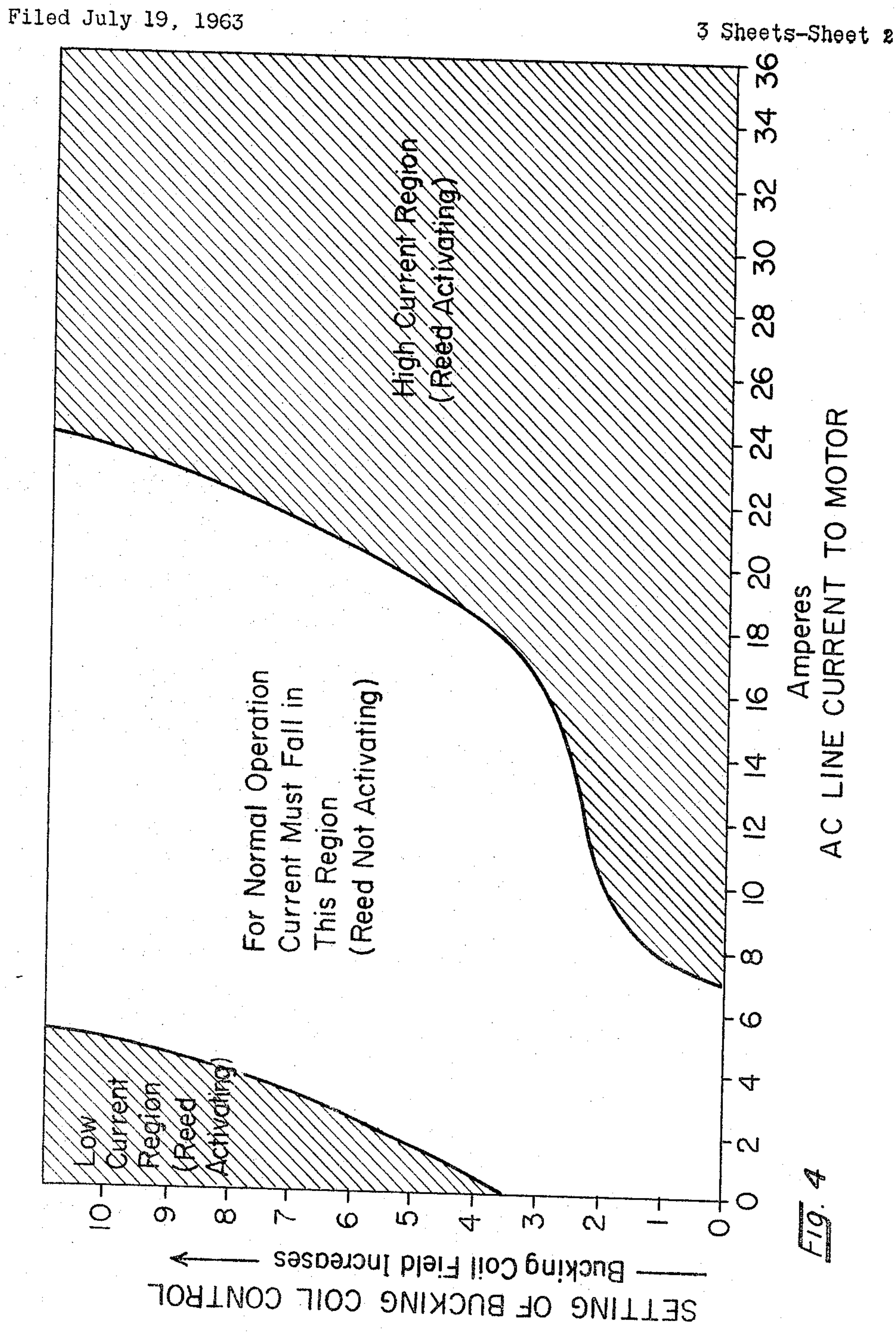
FIGURE 4 is a chart illustrating operation of a form of the invention.

Considering the operation of the invention, it should be appreciated that the purpose of the circuit of the invention, is to effect a control function whenever a particular line current being sensed either exceeds some predetermined value or, depending on the setting of resistor 36, moves below or above a predetermined range of values. In FIGURE 4 there is indicated the general type of operational curves that may be achieved and in which the ordinate axis represents the relative settings of the bucking coil. As resistor 36 is regulated to increase its resistance more current is passed through coil 35 and consequently an increased bucking field is produced, the direction of bucking field increase being up on the ordinate axis of FIGURE 4. The abscissa axis of FIGURE 4 represents line current with the direction of line current increase being to the right on the abscissa axis. From FIGURE 4 it can be seen then that, depending on the particular setting of bucking coil resistor 36, the circuit is adapted to sense only a rise in current or to sense a current below or above a range of values. For example, at the relative setting of resistor 36 below about 3.5 in FIGURE 4, it will be noted that the circuit of the invention can only act as an overcurrent device whereas above the relative setting of 3.5 of resistor 36, the circuit of the invention may act both as an undercurrent as well as an overcurrent device since the operation is over a range of line current values.

Assuming the alternating current voltage supply 15 is energized by a 60-cycle source through switching means not shown, closing of relay 12 will cause the power to flow through reed switch control 14 to the motor 16. An initial surge of current will result and reed switch 31 will vibrate at 120 cycles per second. Prior to energization of the system, capacitor 50 will have been in a discharged condition, capacitor 59 will have been in a discharged position, transistor 55 would be inoperative, relay 13 would be closed and resistor 36 would have been adjusted to some particular setting in accordance with FIGURE 4.

With the current startup surge in the system, the reed switch 31 as previously stated will be vibrating and its closing time will be sufficient to keep capacitor 50 drained of any substantial charge and will thus maintain transistor 55 in an inoperative state. In fact the various component values are chosen such that the necessary timing delay to overcome the startup surge is an inherent characteristic of the invention's circuitry. While some minor current value will trickle through relay 13, the values of the components are again such as to prevent sufficient current to flow at this time to actually open relay 13. That is, during startup, the circuit of the invention automatically accommodates itself to the value and duration of the initial current surge and assumes a steady state sensing condition after a time proportional to the startup surge duration.

As the startup surge current falls toward a steady state value the bucking coil field will gradually overcome the line current coil field until at some point in time there is insufficient resultant field to vibrate reed switch 31 and at this time reed switch 31 will assume its normally open position. Capacitor 50 will now charge and after reaching its full charge, the circuit is in a sensing condition. Assuming that an overloading of motor 16 occurs sufficient to draw line current exceeding the value for which the resistor 36 was set, the field of coil 26 will overcome the field of coil 35 sufficiently to momentarily close reed switch 31 and discharge capacitor 50 through reed switch 31 so as to trigger the base 58 and make transistor 55 operational. A relatively heavy current path is immediately created through the collector 56 and emitter 57 of transistor 55 to the relay 13. Relay 13 will now open and through the circuitry previously explained will cause relay 12 to open thereby shutting off power to motor 16. Depending on the component values chosen, such action can be made to take place in a matter of micro-seconds and substantially faster than thermal relay action and the like.

While it is not desired to be limited to the specific circuit illustrated or to specific component values, the following values, corresponding generally to the operating characteristics of FIGURE 4, were employed in a circuit made according to FIGURE 2:

| | |
|---|---|
| Line supply | 220 volts, 60 cycles. |
| Coil **26** | 6 turns No. 12 wire. |
| Coil **35** | 5000 turns No. 38 wire. |
| Resistor **37** | 10,0000 ohms, 25 watts. |
| Resistor **36** | 20,000 ohms, 25 watts. |
| Resistor **45** | 50,000 ohms, 25 watts. |
| Resistor **46** | 3600 ohms, 25 watts. |
| Rectifier **47** | 750 milliamperes, diode type. |
| Capacitor **50** | 100 μfd., 50 volt. |
| Reed switch **31** | Hamlin DRG-1. |
| Resistor **51** | 910 ohms, ½ watt. |

Capacitor 59 ---------- 20 μfd., 15 volt.
Transistor 55 ---------- General Electric 2N1302.
Relay 13 ---------- Potter-Brumfield KRP50.

With the circuit components described and an artificially induced overload situation, it was found that the power could be tripped in an average of about 1000 micro-seconds.

For direct current operation of the circuit of FIGURE 2, rectifier 47 may be eliminated which insures correct polarity of terminal 20. Thus, with a direct current supply and a direct current motor in place of the alternating current supply and motor, the same type of protection is afforded. For a mixed plant operation of direct current and alternating current motors, the invention's ability to adapt to either application offers a means for substantially reducing inventory of spare controls, spare parts and the like.

It will be noted in considering FIGURE 2 that a basic characteristic is the employment of a secondary direct voltage supply fed by the primary supply and a capacitor so arranged that it charges fully from the secondary supply only after the circuit has undergone the initial startup surge. Another basic characteristic is that the capacitor discharges through an electron valve, the transistor, and operates the control device, the relay, only when the transistor has been triggered by a triggering means that depends on a line current sensing device, this being coil 26 in FIGURE 2 and resistor 60 in FIGURES 5 and 6.

Figure 5:
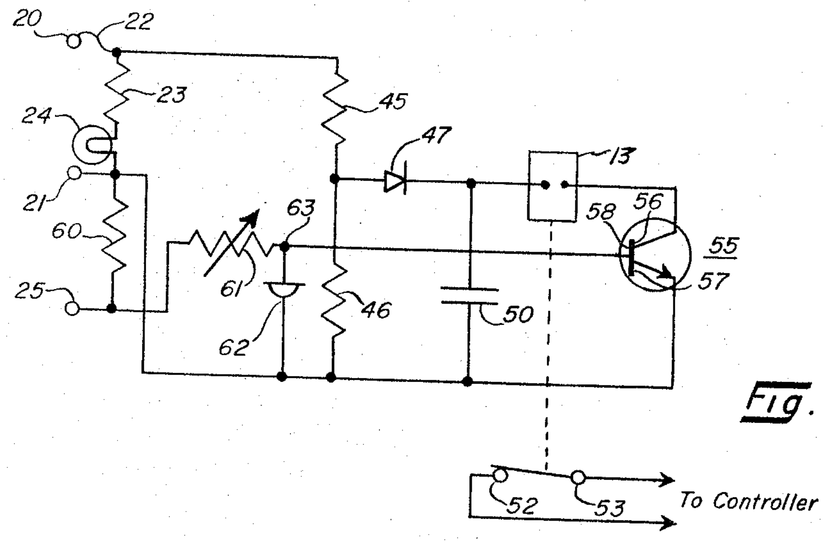
FIGURE 5 is a detailed circuit diagram of an alternative circuit embodying the invention.
Figure 6:
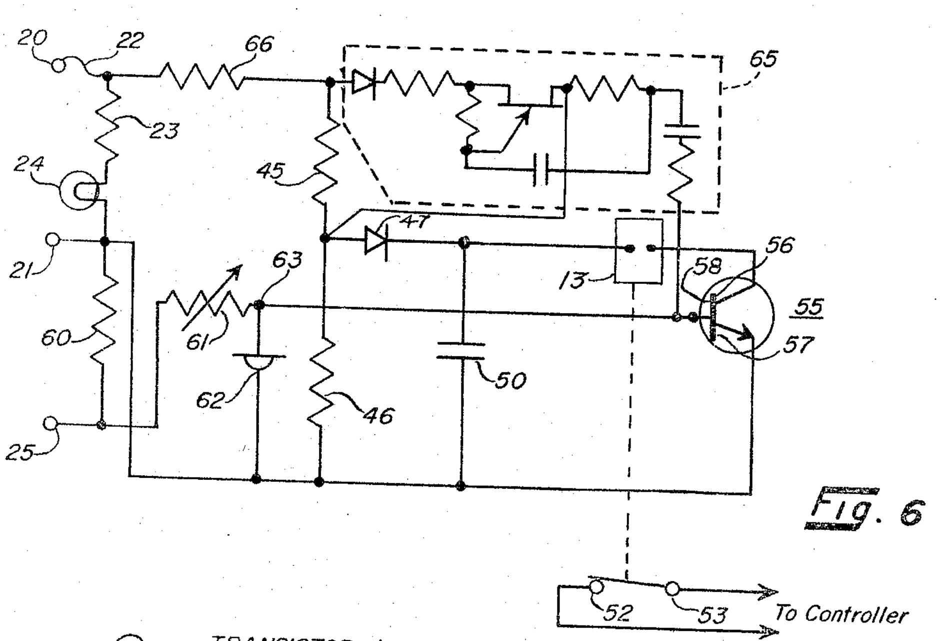
FIGURE 6 is a detailed circuit diagram of a further alternative circuit embodying the invention.
Figure 7:
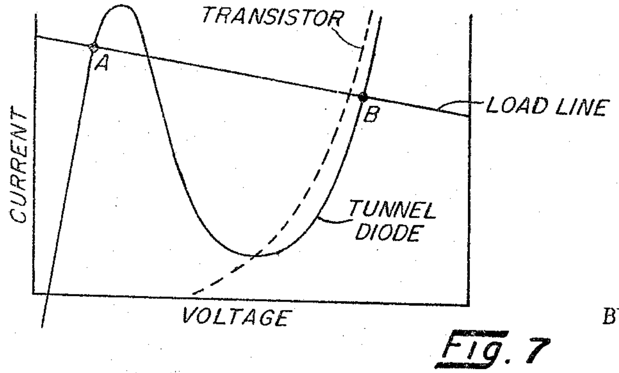
FIGURE 7 is a diagram of typical tunnel diode, transistor and load line curves.

FIGURE 5 and FIGURE 6 illustrate respectively an alternating current circuit and a direct current circuit both of which employ the same basic capacitor and transistor arrangement as in FIGURE 2 and many of the same elements for which the same numerals are used. However, the circuits of FIGURE 5 and FIGURE 6 employ a tunnel diode as a transistor base triggering device in place of the reed switch arrangement of FIGURE 2. In connection with the explanation of FIGURES 5 and 6, typical characteristic curves of a tunnel diode and a transistor are shown in FIGURE 7 and on the curves there is imposed a typical load line.

The principal distinctions between the FIGURE 2 circuit and that of FIGURE 5 and FIGURE 6 resides in the absence of the line coil 26, the bucking coil 35 and the reed switch 31 and the presence of a tunnel diode triggering arrangement.

Considering the circuit of FIGURE 5 which is designed for alternating current application, there is employed a line current resistor 60 of low ohmic value and which is connected between terminals 21, 25, the purpose of resistor 60 being to produce a voltage proportional to the line current flowing between terminals 21 and 25. Terminal 25 is further connected through a variable resistor 61 to the base 58 of transistor 55. A tunnel diode 62 is connected between a junction 63, located between variable resistor 61 and base 58, and terminal 21 such that the voltage developed by resistor 60 is placed across the series arrangement of variable resistor 61 and tunnel diode 62.

Under the influence of a 60-cycle alternating voltage, the tunnel diode 62 is turned on and off 60 times per second, the tunnel diode being arranged such that it is short circuited in the negative direction. While resistances 45 and 46 serve the same purpose as in FIGURE 2 of establishing a voltage divider, resistor 45 in the circuit of FIGURE 5 serves the additional purpose of limiting current on startup such that relay 13 in the FIGURE 5 circuit will remain closed during startup. After the transient startup surge passes, capacitor 50 assumes a full charge and stands by with sufficient potential stored current to actuate relay 13.

As illustrated by FIGURE 7, the tunnel diode 62 is a negative resistance device and switches its voltage state in response to current magnitude. Assuming variable resistor 61 establishes the load line indicated in FIGURE 7 and that the circuit is operating at point A on the curves of FIGURE 7, a rise in voltage across resistor 60 caused by an overload current will almost instantaneously shift the operating point to a new point represented at B. The transistor base 58 will simultaneously and almost instantaneously be pulsed by reason of the changing characteristic of the tunnel diode 62 which causes the now charged capacitor 50 to discharge through transistor 55 and relay 13 thereby breaking the connection between contacts 52 and 53.

When the circuit of FIGURE 5 is applied to direct current application it becomes necessary to provide some means for resetting the circuit from point B to point A after the circuit has undergone an overload condition. This is accomplished by the uni-junction relaxation oscillator circuit represented by the dashed line enclosure 65 and which is fed through an additional current limiting resistor 66. An oscillator circuit of this kind is explained in the book "Electronics In Engineering" by W. Ryland Hill (1961, McGraw-Hill Publishers) and for this reason is not treated herein detail. The purpose of the relaxation oscillator circuit 65 so far as the FIGURE 6 circuit is concerned is to furnish a continuous series of negative pulses to the junction point 63 which effectively resets the circuit back to point A each time the relaxation oscillator produces a pulse which of course depends on its R-C time constant.

While preferred embodiments of the invention have been described, it is to be noted that various changes may be made in the circuit arrangements and in the components employed without departing from the spirit and scope of the invention.

What is claimed is:

1. In combination, an alternating voltage load circuit, means for supplying alternating voltage to the load circuit, a load circuit interrupter, a relay having a coil operative when energized to actuate the interrupter, a direct voltage supply energized from said alternating voltage supply, a substantially low impedance coil disposed to produce a magnetic field proportional to a line current in the load circuit, a normally open magnetic field operated switch disposed to be closed by some predetermined value of the low impedance coil field, means to vary the influence of said low impedance coil field on said magnetic field switch, a capacitor connected to be charged by said direct voltage supply when said switch is open and to be discharged through said switch when closed, an electron valve having a control gate electrode connected to be energized by current from said switch when closed, said valve being effective when said gate is energized to connect said relay coil with said direct voltage supply, whereby to actuate said interrupter upon the obtaining of said value.

2. The combination of claim 1 in which said field varying means comprises a bucking coil and variable shuting resistor for the bucking coil.

3. In combination, an electrical load circuit; a primary direct voltage supply for said load circuit; a load circuit interrupter; a relay having a coil operative when energized to actuate said interrupter; a secondary direct voltage supply energized from said first supply; a capacitor connected to be charged by said secondary direct voltage supply; means effective to automatically limit the rate of charging of said capacitor wherein said capacitor does not become fully charged under the influence of a transient startup current surge; an electron valve having a control gate electrode and being effective to open an electrical path from said capacitor through said valve to said relay; electrical triggering means including a tunnel diode connected across a low resistance line current resistor and arranged to be dependent on the strength of the line current to said load, said tunnel diode being effective to trigger said gate upon the obtaining of some predetermined value whereby to energize said relay with current from said capacitor and relaxation oscillator means to reset said tunnel diode following energization of said relay.

References Cited by the Examiner

UNITED STATES PATENTS

| | | | |
|---|---|---|---|
| 2,053,445 | 9/1936 | Rose | 317—151 X |
| 3,105,174 | 9/1963 | Carson et al. | 317—151 X |

OTHER REFERENCES

SCR Manual, Second Edition, General Electric Company, 1961, C. 3, pp. 98–99.

MILTON O. HIRSHFIELD, *Primary Examiner.*

J. D. TRAMMELL, *Assistant Examiner.*